April 13, 1948.	F. J. REINHART	2,439,633
AUTOMATIC FILTER APPARATUS
Filed Aug. 14, 1945
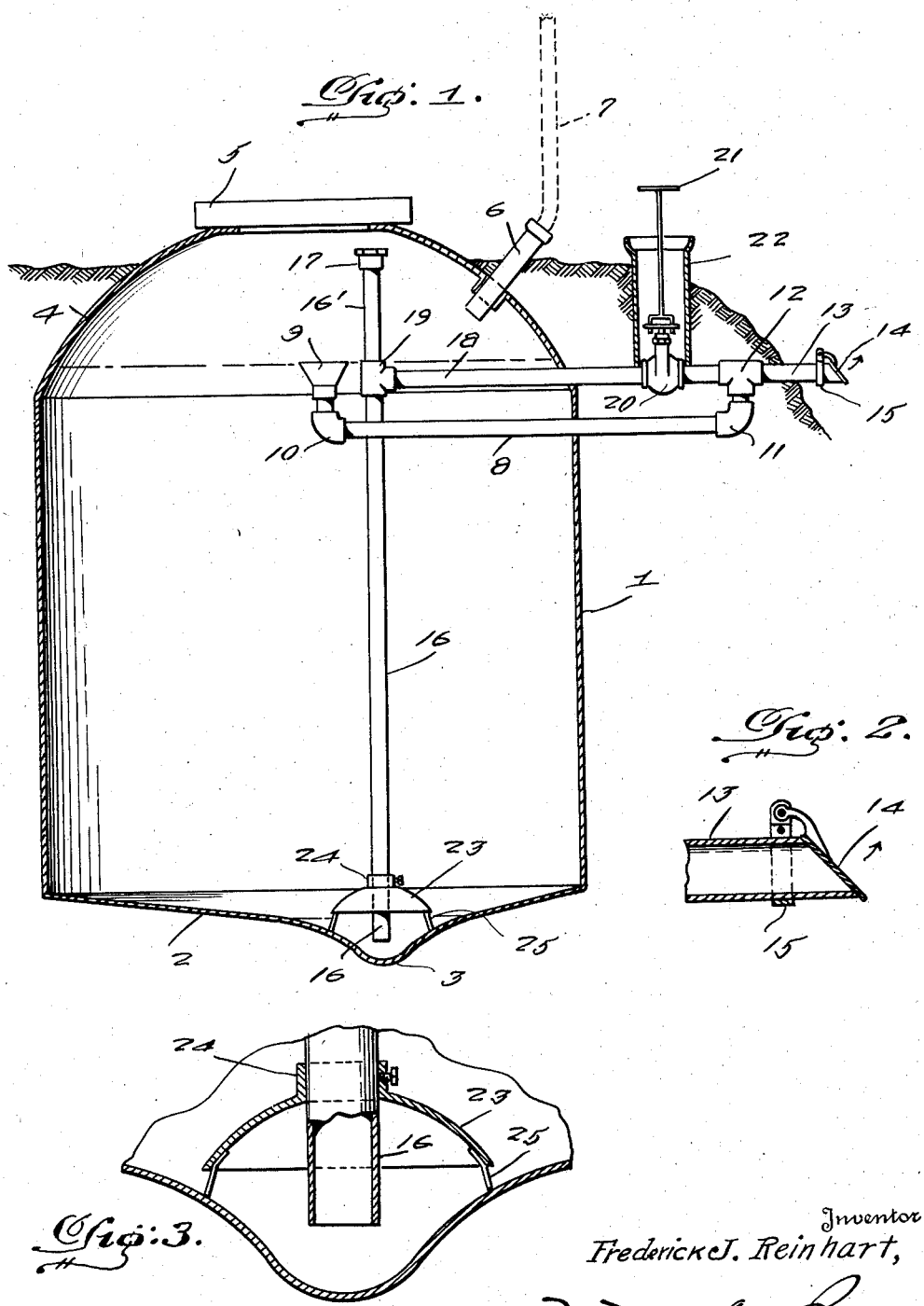
Inventor
Frederick J. Reinhart, Patented Apr. 13, 1948

2,439,633

UNITED STATES PATENT OFFICE 2,439,633

AUTOMATIC FILTER APPARATUS

Frederick J. Reinhart, Ludlow, Ky.

Application August 14, 1945, Serial No. 610,729

5 Claims. (Cl. 210—209)

This invention relates to a filter apparatus, and more particularly to an automatic filter device for filtering dirt, mud, or sediment from cisterns, reservoirs or tanks of any kind containing a liquid.

An object of this invention is to provide an improved filter device comprising a series of pipes, which may be built into a cistern, reservoir or tank, and a valve control for initiating automatic filtering of dirt or sediment out of the cistern, reservoir or tank.

Another object of this invention is to provide an improved filter arrangement including an overflow pipe, a filter pipe, and a sediment basin all contained within a cistern, reservoir or tank, and valve means outside of the cistern, reservoir or tank for causing liquid in the cistern, reservoir or tank to be forced out through the filter pipe under pressure of the liquid itself, said forced-out liquid entraining sediment contained in the sediment basin.

Still another object of this invention is to provide a filter apparatus in a tank, reservoir or cistern wherein a head of liquid normally present in the tank, reservoir or cistern is released by a valve to carry sediment out of the tank, reservoir or cistern to purify the liquid remaining.

It is a further object of this invention to provide a filtering apparatus in a tank, reservoir or cistern containing a liquid whereby dirt and scum may be withdrawn from the top of the liquid and also whereby sediment may be withdrawn from the bottom of the tank, reservoir or cistern.

Other objects of this invention will appear from the following specification and claims and from the accompanying drawings illustrating the invention, wherein:

Figure 1 is a sectional elevational view through a cistern or tank showing the filter apparatus;

Figure 2 is a fragmentary section showing the outlet valve; and

Figure 3 is a fragmentary section showing the sediment basin in the bottom of the cistern or tank and showing part of the filter pipe.

Referring to the figures, the cistern or tank 1 is shown as embedded in the ground and has its bottom 2 sloping downwardly to merge into a trough-like sediment basin 3 in the bottom. In the specific embodiment illustrated the basin 3 is offset from the center of the tank or cistern to allow for a pump to be installed in the center, if desired. The top of the tank or cistern may be arched, as at 4, and has a removable cap 5, affording access to the interior. The cistern illustrated has an intake pipe 6, made preferably of tile, which may be connected to a roof or other source of rainwater by pipe 7, shown in dotted lines.

Within the cistern an overflow pipe 8 is situated which has an inlet funnel 9 connected thereto by an elbow 10. The overflow pipe extends out of the cistern and is connected by elbow 11 and T 12 to an outlet pipe 13. The end of outlet pipe 13 is cut diagonally and is closed by a gravity biased trap lid 14 hinged to a ring 15 fastened around pipe 13. Trap lid 14 will automatically open when water starts flowing out through outlet pipe 13 but is normally kept closed by gravity to keep insects out of the cistern.

Filter pipe 16 is vertically disposed in the cistern having its lower end extending within the sediment basin 3 and spaced therefrom, and having at its upper end a pipe 16' extending above the funnel 9 and closed by a removable cap 17. Filter pipe 18 is horizontally disposed about twelve inches below the top of funnel 9, is connected to filter pipe 16 through a T 19, and extends out of the tank for connection to the T 12. Filter pipe 18 is provided with a gate valve 20, which is operated by handle 21 extending above the ground through a tile pipe 22. At the bottom of the cistern over sediment basin 3 is located an inverted funnel 23 which is fastened to filter pipe 16 by a bushing 24 soldered to the funnel. The funnel 23 is maintained in spaced relation from the bottom of the cistern by four legs 25 spaced around the funnel and fastened thereto.

In operation of the cistern and filter illustrated, the water level will normally be limited by the top part of funnel 9. However, after a heavy rain, water will momentarily rise above funnel 9, but this excess water will flow out of the cistern through overflow pipe 8, outlet pipe 13 and lid 14. At the same time the excess water will carry with it dirt and scum that might accumulate on top of the water. During this overflow and for several days thereafter, the gate valve 20 is kept closed to give heavier dirt and sediment sufficient time to settle down into the sediment basin 3. After this occurs, the valve 20 is opened and water starts flowing out from the bottom of the cistern upwardly through filter pipe 16, filter pipe 18, and out through outlet pipe 13. This flow is caused by the head of water in the cistern above filter pipe 18. In the specific embodiment illustrated, this head is twelve inches at the start of the flow, that is, the height of funnel 9 above filter pipe 18. As the water starts lowering in the cistern and comes up through pipe 16, it will flow around inverted funnel 23 and up into pipe 16 and will entrain accumulated sediment located in the sediment basin 3 and carry same out of the cistern. The legs 25 are about one inch in length and this forms a narrow opening which speeds up the flow of water at this point to facilitate the entrainment of sediment by the water.

The removable cap 17 on pipe 16 is for the purpose of enabling pipe 16 to be cleaned out if it clogs.

The filter apparatus described may also be used in wine or beer casks for removing sediment from the bottom of the cask. It also may be used on mud pans in locomotives to remove the mud.

The apparatus described may also be used to remove mud and filth from cisterns or catch basins behind flood walls erected near cities or towns subject to flood conditions.

While a certain specific embodiment of this invention has been shown, it will be understood that various modifications may be made within the spirit of the invention.

I claim:

1. The combination of a tank for liquid and a purifying apparatus, said tank having a sediment basin in its bottom and said purifying apparatus comprising an overflow pipe, a sludge pipe, and a valve in said sludge pipe, said overflow pipe limiting the height of the liquid in said tank and being positioned above said sludge pipe to form a head of liquid above said sludge pipe, said sludge pipe extending down into and spaced from the bottom of said sediment basin, whereby when said valve is opened, liquid will be forced out of said tank through said sludge pipe while entraining sediment from said sediment basin.

2. The combination of a tank for liquid and a purifying apparatus as claimed in claim 1, wherein an inverted funnel is provided spaced from the bottom of said sediment basin to form a narrow passage for the liquid whereby said liquid is speeded up in passing through the sediment basin.

3. The combination of a tank for liquid and a purifying apparatus as claimed in claim 1, wherein said sediment basin comprises a U-shaped trough forming part of the bottom of said tank and wherein an inverted funnel is provided spaced from the bottom of said sediment basin to form a narrow passage for the liquid whereby said liquid is speeded up upon entering said sediment basin to entrain a maximum of sediment.

4. The combination of a tank for liquid and a purifying apparatus as claimed in claim 1, wherein said sediment basin is formed in the bottom of said tank and wherein an inverted funnel is provided spaced from the bottom of said sediment basin to form a narrow passage for the liquid and wherein a gravity valve is provided at the outlet of said sludge pipe, whereby liquid will be forced around said inverted funnel, through said sediment basin, through said sludge pipe and through said gravity valve.

5. In a purifying device for a tank containing liquid, an overflow pipe in the tank leading to an outlet outside of the tank, a sludge pipe in the tank leading to an outlet, said overflow pipe being positioned above said sludge pipe to form a pressure head of liquid above said sludge pipe, said sludge pipe extending downwardly and spaced from the bottom of said tank, a valve in said sludge pipe whereby when said valve is closed an overflow of liquid in said tank will flow out from the top of the tank through said overflow pipe carrying surface scum therewith and when said valve is opened, the liquid pressure head will cause liquid to flow out from the bottom of the tank through said sludge pipe carrying therewith sediment from the bottom of the tank.

FREDERICK J. REINHART.

REFERENCES CITED

The following references are of record in the file of this patent:

UNITED STATES PATENTS

| Number | Name | Date |
|---|---|---|
| 969,997 | Thiem | Sept. 13, 1910 |
| 1,188,159 | Dittrick | June 20, 1916 |

FOREIGN PATENTS

| Number | Country | Date |
|---|---|---|
| 85,041 | Switzerland | 1916 |
| 109,719 | Germany | Mar. 29, 1900 |